United States Patent Office 3,679,549
Patented July 25, 1972

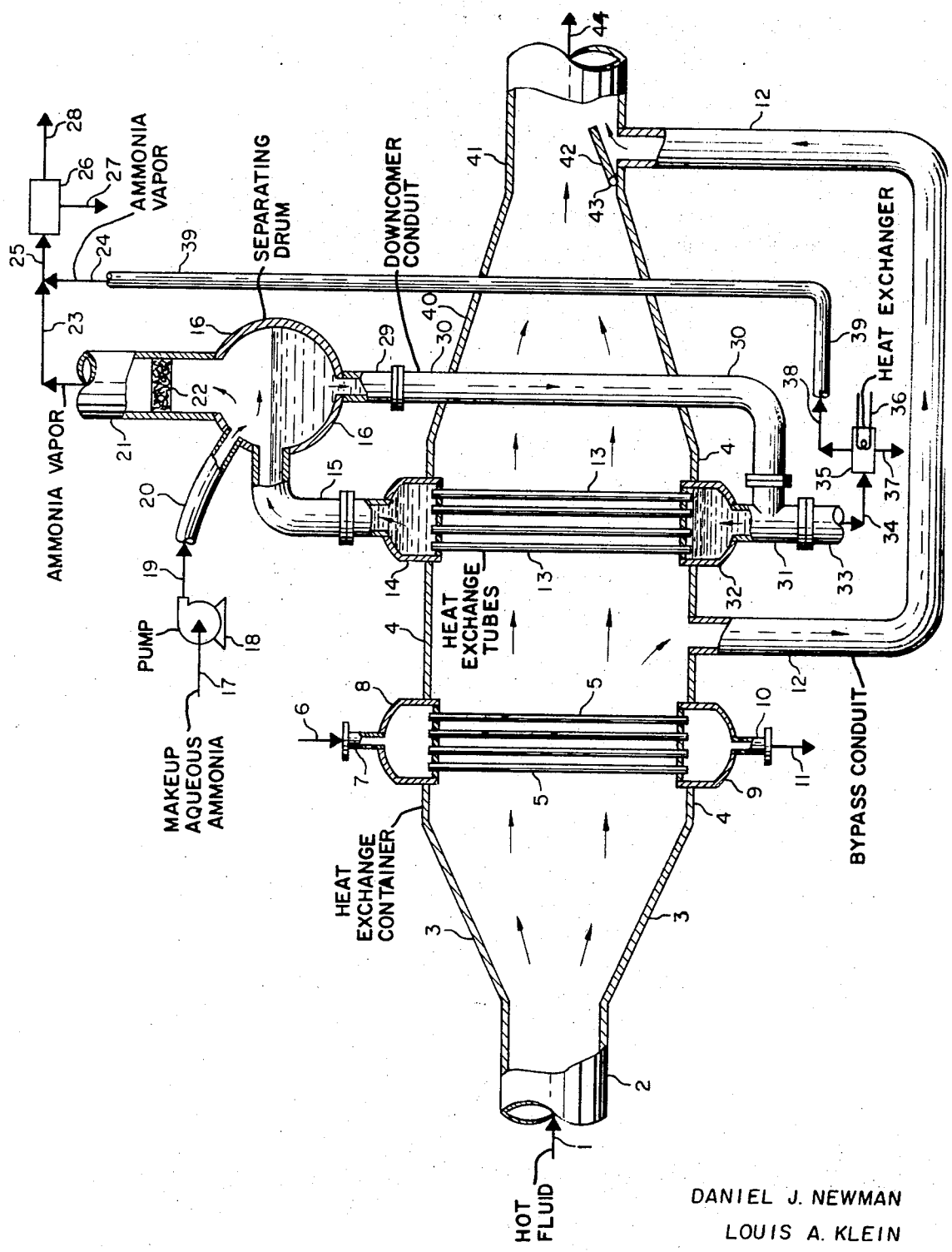

3,679,549
SEPARATION OF AMMONIA IN A THERMOSYPHON EVAPORATOR
Daniel J. Newman, Jackson Heights, and Louis A. Klein, Flushing, N.Y., assignors to Chemical Construction Corporation, New York, N.Y.
Filed Dec. 15, 1969, Ser. No. 885,145
Int. Cl. B01d 3/04
U.S. Cl. 203—12
9 Claims

ABSTRACT OF THE DISCLOSURE

The ammonia content of an aqueous liquid ammonia stream is selectively vaporized as a concentrated vapor in a thermosyphon type of vaporizer by indirect heat exchange with a hot fluid, and a side stream of the circulating aqueous ammonia is drawn off and separately heated to a higher temperature for recovery of additional ammonia vapor.

BACKGROUND OF THE INVENTION

Field of the invention

The invention relates to the selective vaporization of the ammonia content of an aqueous ammonia stream, with the resultant ammonia vapor preferably being employed in an associated high pressure nitric acid production facility, so that relatively low temperature heat which formerly had been discarded to cooling water (from process gas) or was vented to atmosphere (from expanded tail gas) may be usefully recovered.

Description of the prior art

The general procedure in the evaporation of an ammonia stream, typically in order to provide ammonia vapor as a feed stream for a nitric acid plant, is to provide a once-through evaporation system. When the ammonia as supplied contains a high percentage of brine or water, typically about 4% water content by weight, an unacceptable amount of corrosion and scaling may take place, and in addition the concentration of liquid ammonia in equilibrium with the vapor containing 4% water may approach 40% by weight or less, with resultant high boiling point of the equilibrium solution, when the once-through evaporator is operated at elevated pressure, which is generally the case when the ammonia vapor is to be the feed stream to a high pressure nitric acid plant. Because of the high boiling point of the resultant aqueous ammonia phase in the once-through evaporator, an uneconomically large exchanger is required. Typical conditions developed in such a unit are an aqueous ammonia solution containing 40% ammonia content by weight, which has a boiling point at 12 kg./sq. cm. of 88° C.

SUMMARY OF THE INVENTION

In the present invention, a thermosyphon boiler type of aqueous ammonia evaporator with a separate drum is provided, to insure constant submergence of the evaporator coils as well as high velocities to insure against corrosion and scaling. The separating drum is usually provided with a U-tube bundle or the like, to serve as an auxiliary evaporator to permit start-up with steam. Typically, equivalent to about 1% of the aqueous ammonia feed will be removed or blown down from the evaporator to a separate heat exchanger which serves as an ammonia purifier. The purifier is operated at a higher temperature than the main thermosyphon evaporator, and generates a second stream of ammonia vapor with discharge of residual water or brine having negligible residual ammonia content. In this way, the ammonia to be evaporated in the main thermosyphon boiler is typically at a concentration of 60% ammonia content by weight, boiling at 52° C. at a pressure of 12 kg./sq. cm., which greatly reduces the heat transfer surface required for any specific installation.

The principal advantage of the invention is that the ammonia content of an aqueous ammonia solution is evaporated in a more efficient manner, employing less heat transfer surface and enabling the efficient usage of low temperature level heat sources for evaporation, such as the reheated and expanded tail gas from a high pressure nitric acid process. Another advantage is that corrosion and scaling are effectively prevented, due to the high velocity of circulation of the aqueous ammonia in the thermosyphon evaporator. The constant submergence of the heat exchange surfaces in this unit also minimizes corrosion. Another advantage is that the ammonia concentration in the aqueous ammonia circulating through the system is maintained at a high level, so that boiling takes place at a relatively low temperature even under elevated pressure conditions.

It is an object of the present invention to provide an improved method and apparatus for vaporizing the ammonia content of an aqueous ammonia solution.

Another object is to produce concentrated ammonia vapor from aqueous ammonia in an improved manner.

An additional object is to prevent corrosion and scaling during the evaporation of aqueous ammonia solutions containing brine or the like.

A further object is to vaporize the ammonia content of aqueous ammonia solutions at a reduced temperature with diminished heat exchange surface requirements.

Still another object is to provide an improved method and apparatus for vaporizing the ammonia content of aqueous ammonia solutions employing a low temperature level heat source for vaporization.

These and other objects and advantages of the present invention will become evident from the description which follows.

DESCRIPTION OF THE DRAWING AND PREFERRED EMBODIMENTS

Referring now to the drawing, a sectional elevation view of a preferred embodiment of the invention is presented. A hot fluid stream 1, which as will appear infra, is typically the reheated and expanded tail gas from a nitric acid process, is passed via conduit 2 and frusto-conical expansion section 3 into the horizontal heat exchange container 4, in which the hot gas is typically initially partially cooled by indirect heat exchange with a suitable process fluid, such as cold tail gas from the nitric acid absorption tower of an associated nitric acid production facility. The hot gas in section 4 passes initially external to heat exchanger tubes 5, and a cold fluid stream 6 such as the cold tail gas mentioned supra is passed downwards via nozzle 7 and manifold 8 and into tubes 5. The resultant heated fluid is discharged from tubes 5 into manifold 9, from which the heated fluid is removed via nozzle 10 as stream 11.

The partially cooled fluid stream heat source discharged external to tubes 5 and within container 4 is now preferably divided, with a portion of the fluid stream being bypassed around the apparatus of the present invention via conduit 12. The balance and generally a major portion of the fluid heat source flows within container 4 external to the vertically oriented heat exchange tubes 13, within which circulating aqueous ammonia flows upwards due to a thermosyphon effect caused by the indirect heat transfer from the external fluid heat source to the aqueous ammonia within tubes 13. The aqueous ammonia circulating upwards within tubes 13 typically contains in the range of about 50% to 90% ammonia content by weight, and due to indirect heat exchange with the warmer fluid external to tubes 13, boiling and partial vaporization of the aqueous ammonia takes place within the tubes 13, with the evolved vapor portion principally consisting of ammonia. Typical operating conditions within the tubes 13 are at temperature in the range of about 20° C. to 70° C. and a pressure in the range of about 5 kg./sq. cm. to 20 kg./sq. cm. The resulting mixture of evolved vapor and residual liquid phases flows upwards from tubes 13 into header or manifold 14, from which the vapor-liquid mixture flows via the curved connecting nozzle or conduit 15 into the upper vapor-liquid separating drum 16, in which the evolved vapor phase is separated from residual liquid aqueous ammonia, which collects in the lower part of unit 16. Makeup aqueous ammonia stream 17, which typically contains in the range of about 0.5% to 10% water or brine content by weight, balance ammonia, is passed via pump 18 and stream 19 into liquid inlet pipe 20, which discharges stream 17 into drum 16. A portion of the ammonia content of stream 17 may be spontaneously evolved or flashed off from the liquid phase when the makeup ammonia stream 17 is charged into drum 16.

The ammonia vapor evolved and separated in drum 16 is removed via upper vapor draw-off conduit 21, which may be provided with a mesh entrainment separator 22 or the like to remove entrained liquid droplets from the vapor stream and return the entrained liquid to drum 16. The evolved ammonia vapor passes from conduit 21 via stream 23, which is preferably combined with ammonia vapor stream 24 to form stream 25. Stream 24 is derived from within the procedural sequence of the present invention, as will appear infra. Stream 25 is preferably passed to an associated nitric acid production facility 26, in which in accordance with known practice the ammonia vapor stream 25 is mixed with air and the ammonia is catalytically partially oxidized to yield a process gas stream containing nitrogen oxides, which is cooled and contacted with an aqueous absorbent solution to yield product nitric acid stream 27 and residual tail gas stream 28, which may be reheated as stream 6, with the heated tail gas stream 11 being further heated, processed to destroy residual nitrogen oxides, expanded through a gas turbine or other mechanical power recovery means, and then utilized for heating purposes as stream 1.

Returning to drum 16, the liquid aqueous ammonia phase is removed via lower outlet nozzle 29, which extends to the vertically oriented downcomer conduit 30, through which the aqueous ammonia flows downwards to provide circulation of aqueous ammonia. Conduit 30 extends to the branched flow dividing T-member 31, in which the circulating aqueous ammonia stream from conduit 30 is divided, with major portion of the aqueous ammonia flowing upwards from element 31 into the header or manifold 32, from which the aqueous ammonia flows upwards through tubes 13 as described supra.

The balance of the aqueous ammonia from conduit 30 flows downwards through element 31 and is drawn off from the main circulating aqueous ammonia stream via pipe 33 as stream 34, which is generally less than about 10% of the main circulating aqueous ammonia stream flowing through conduit 30, tubes 13 and drum 16. Stream 34 is passed into ammonia purifier 35, which is generally a heat exchanger in which the withdrawn aqueous ammonia stream 34 is heated to a temperature higher than the temperature of the circulating aqueous ammonia or higher than the initial temperature of stream 34, so as to selectively evolve further ammonia vapor. The aqueous ammonia in unit 35 is heated by the provision of heating element 36, which is generally a steam coil or the like. Essentially all of the ammonia derived from stream 34 is vaporized in unit 35, generally by heating stream 34 to a temperature in the range of 25° C. to 90° C., and the residual liquid phase drawn off from unit 35 via stream 37 consists essentially of water or brine containing at most a very minor residual percentage of ammonia, such as about 3% or less. The product vaporized ammonia is withdrawn from unit 35 via stream 38, which passes into pipe 39 and is discharged as stream 24, which is utilized as described supra.

Returning to tubes 13, the tail gas or other heat exchange fluid is fully cooled from fluid flow transverse and external to tubes 13, and the resulting fluid flows from container 4 into the converging frusto-conical passage member 40, from which the fully cooled fluid flows into discharge conduit 41. The by-passed heat exchange fluid portion from by-pass conduit 12 is added to the main stream in conduit 41, with flow of by-pass fluid being controlled by damper 42 mounted on adjustable support 43. Damper 42 may be adjusted to the open position on startup of the unit, in which case all of the heat exchange fluid such as cold tail gas would flow through by-pass 12 since flow through conduit 41 from section 40 would be restricted or completely prevented. In this case, evolution of ammonia vapor would be attained by the passage of heating steam through coils, not shown, disposed in drum 16. In other instances, the flow of by-pass fluid through conduit 12 may be modulated or regulated at partial flow to permit control of the vaporization rate in tubes 13, in such instances as when the facility is to be operated at partial capacity. The final cooled heat exchange fluid is removed from the facility via conduit 41 as stream 44, which in the case of tail gas may be discharged to the atmosphere via a stack or the like.

Numerous alternatives within the scope of the present invention, besides those alternatives mentioned supra, will occur to those skilled in the art. The ranges of process variables such as concentrations and temperatures constitute preferred embodiments for optimum utilization of the concepts of the invention, and the invention may be practiced outside of these ranges in suitable instances. The initial heat exchange unit defined by elements 5, 8 and 9 may be omitted in some cases. As mentioned supra, a steam coil or the like will usually be provided in drum 16, for startup purposes in instances when stream 1 is below the requisite temperature for ammonia vaporization at startup of the facility. Stream 1 may consist of any of a variety of suitable heat exchange fluids, such as heated nitric acid tail gas mentioned supra, preheated air or water, steam, a hot process fluid, or the like. The aqueous ammonia may also be circulated through the system via a monia is heaed by indirect heat exchange with said steam.

An example of an industrial application of the present invention to ammonia evaporation using tail gas from a nitric acid facility as a heat source will now be described.

Example

Following are the specifications of design conditions of the heat exchanger units employed in the facility.

TABLE I.—TAIL GAS PREHEATER (TUBES 5)

| | Shell side | Tube side |
|---|---|---|
| Fluid circulated | Tail gas (stream 1) | Tail gas (Stream 2) |
| Total fluid entering, kg./hr | 67,500 | 67,200 |
| Liquid entering, kg./hr | | *168 |
| Steam entering, kg./hr | 1,430 | 331 |
| Non-condensables entering, kg./hr | 66,000 | 66,600 |
| Temperature, ° C.: | | |
| In | 246 | 60 |
| Out | 165 | 121 |
| Pressure, kg./sq. cm | 1 | 6.7 |

*Vaporized in tubes. (20% nitric acid.)

TABLE II.—AMMONIA VAPORIZER (TUBES 13)

| Fluid circulated | Shell side | Tube side |
|---|---|---|
|  | Tail gas | Aqueous ammonia |
| Total fluid entering, kg./hr | 67,500 | 5,045*. |
| Liquid entering, kg./hr |  | 4,830 ammonia. 215 water. |
| Steam entering, kg./hr | 1,430 |  |
| Non condensables entering, kg./hr | 66,000 |  |
| Fluid vaporized, kg./hr |  | 4,580 ammonia. 32 water. |
| Blowdown (Stream 34), kg./hr |  | 250 ammonia. 183 water. |
| Temperature, ° C.: |  |  |
| In | 165 | 19*. |
| Out |  | 53. |
| Pressure, kg./sq. cm | 1 | 11.3. |

*Flow is fed to drum 16. Feed vaporizer tubes 13 to 60% aqueous ammonia at 53° C.

We claim:

1. A method of evaporating the ammonia content of an aqueous ammonia stream which comprises adding said aqueous ammonia stream to a body of aqueous ammonia, circulating aqueous ammonia downwards from said body of aqueous ammonia to the bottom of a first indirect heating zone and upwards through said first zone, circulating a first hot fluid in indirect heat exchange with said aqueous ammonia in said first zone, whereby a circulation of said aqueous ammonia from said body of aqueous ammonia and upwards through said first zone is produced and a portion of said aqueous ammonia is vaporized, said vaporized portion principally consisting of ammonia vapor, returning the resulting vapor-liquid mixture from the upper end of said first zone to said body of aqueous ammonia, whereby a first vapor portion principally containing ammonia is separated, withdrawing said first vapor portion from said body of aqueous ammonia as a first stream of product evaporated ammonia, withdrawing a minor portion of aqueous ammonia from the circulating aqueous ammonia, heating said withdrawn minor portion of aqueous ammonia in a second indirect heating zone to a temperature higher than the temperature of said circulating aqueous ammonia by heat exchange with a second hot fluid, said second fluid being at a higher temperature than said first hot fluid, whereby a second vapor portion principally containing ammonia is generated from said minor portion of aqueous ammonia, withdrawing said second vapor portion from said second zone as a second stream of product evaporated ammonia, and withdrawing a residual liquid phase principally containing water from said second zone.

2. The method of claim 1, in which said aqueous ammonia stream contains in the range of 0.5% to 10% water content by weight.

3. The method of claim 1, in which said first hot fluid is the residual tail gas derived from the production of nitric acid by catalytic oxidation of ammonia vapor at elevated pressure with an oxygen-containing gas to produce a process gas stream containing nitrogen oxides, said process gas stream being contacted with an aqueous solution to selectively absorb nitrogen oxides to form nitric acid and produce a residual gas phase which is heated and expanded through mechanical power recovery means to produce said residual tail gas.

4. The method of claim 3, in which said ammonia vapor comprises said first and said second streams of product evaporated ammonia.

5. The method of claim 1, in which said minor aqueous ammonia portion is less than about 10% of the circulating aqueous ammonia.

6. The method of claim 1, in which said circulating aqueous ammonia contains in the range of about 50% to 90% ammonia content by weight.

7. The method of claim 1, in which said circulating aqueous ammonia is heated to a temperature in the range of 20° C. to 70° C. at a pressure in the range of 5 kg./sq. cm. to 20 kg./sq. cm. within said first zone.

8. An apparatus for evaporating the ammonia content of an aqueous ammonia stream which comprises a vapor-liquid separating drum, means to pass said aqueous ammonia stream into said drum, a conduit, said conduit depending downwards from said drum, whereby aqueous ammonia is discharged from said drum into the upper end of said conduit and flows downwards through said conduit, a plurality of vertically oriented tubes, means to pass a first hot fluid external to said tubes, means to pass said flowing aqueous ammonia from the lower end of said conduit into the lower ends of said tubes, whereby said flowing aqueous ammonia is heated within said tubes by indirect heat exchange with said first hot fluid and thereby rises through said tubes and is partially vaporized within said tubes, means to pass the resulting mixture of vapor and residual liquid aqueous ammonia from the upper ends of said tubes into said vapor-liquid separating drum, whereby the vapor evolved in said tubes is separated from residual liquid aqueous ammonia in said drum, means to remove the evolved vapor comprising a first stream of product ammonia vapor from said drum, means to withdraw a minor portion of aqueous ammonia from said flowing aqueous ammonia, an indirect heat exchanger, means to pass said withdrawn minor portion of aqueous ammonia through said indirect heat exchanger, means to pass a second hot fluid through said indirect heat exchanger, said second fluid being at a higher temperature than said first fluid, whereby said minor portion of aqueous ammonia is heated to a temperature higher than the temperature of said flowing aqueous ammonia and a vapor portion is evolved in said indirect heat exchanger, means to remove the evolved vapor portion comprising a second stream of product ammonia vapor from said indirect heat exchanger, and means to remove a residual liquid phase principally containing water from said indirect heat exchanger.

9. The apparatus of claim 8, in which said indirect heat exchanger is a container provided with at least one internal coil, together with means to pass said second fluid through said coil, said second fluid principally consisting of steam, whereby said minor portion of aqueous ammonia is heated by indirect heat exchange with said steam.

References Cited

UNITED STATES PATENTS

| 3,335,071 | 8/1967 | Bollen et al. | 203—85 |
| 916,054 | 3/1909 | Suzuki | 159—17 X |
| 1,856,061 | 4/1932 | Donnelly | 203—100 X |
| 2,224,925 | 12/1940 | Potts et al. | 203—87 |
| 2,643,974 | 6/1953 | Impagliazzo | 203—100 X |
| 3,383,173 | 5/1968 | Bollen | 23—196 |
| 1,798,946 | 3/1931 | Maiuri et al. | 62—497 XR |
| 2,141,609 | 12/1938 | Lenning | 62—493 XR |
| 2,287,441 | 6/1942 | McGinnis | 62—497 XR |
| 2,785,543 | 3/1957 | Kogel | 62—497 XR |
| 3,254,507 | 6/1966 | Whitlow | 62—497 XR |

FOREIGN PATENTS

| 306,947 | 7/1930 | Great Britain | 23—193 |

NORMAN YUDKOFF, Primary Examiner

D. EDWARDS, Assistant Examiner

U.S. Cl. X.R.

203—71; 202—172, 153; 23—193; 62—497

UNITED STATES PATENT OFFICE
CERTIFICATE OF CORRECTION

Patent No. 3,679,549         Dated  July 25, 1972

Inventor(s)  Daniel J. Newman and Louis A. Klein

It is certified that error appears in the above-identified patent and that said Letters Patent are hereby corrected as shown below:

In the drawing title, read "THERMOSYPHON" instead of "THERMOSYPHOR".

Col. 4 line 53, read "pump or pumps" instead of "monia is heaed by indirect heat exchange with said steam". Also Table I, read "Stream 6" instead of "Stream 2". Also Table I, read "248" instead of "246". Also Table I, read "8.7" instead of "6.7".

Col. 5 Table II at line 15, read "feed" instead of "fed". Also read "to" after "Feed". Also read "is" after "13" instead of "to".

Signed and sealed this 12th day of December 1972.

(SEAL)
Attest:

EDWARD M. FLETCHER, JR.
Attesting Officer

ROBERT GOTTSCHALK
Commissioner of Patents